Patented Nov. 16, 1943

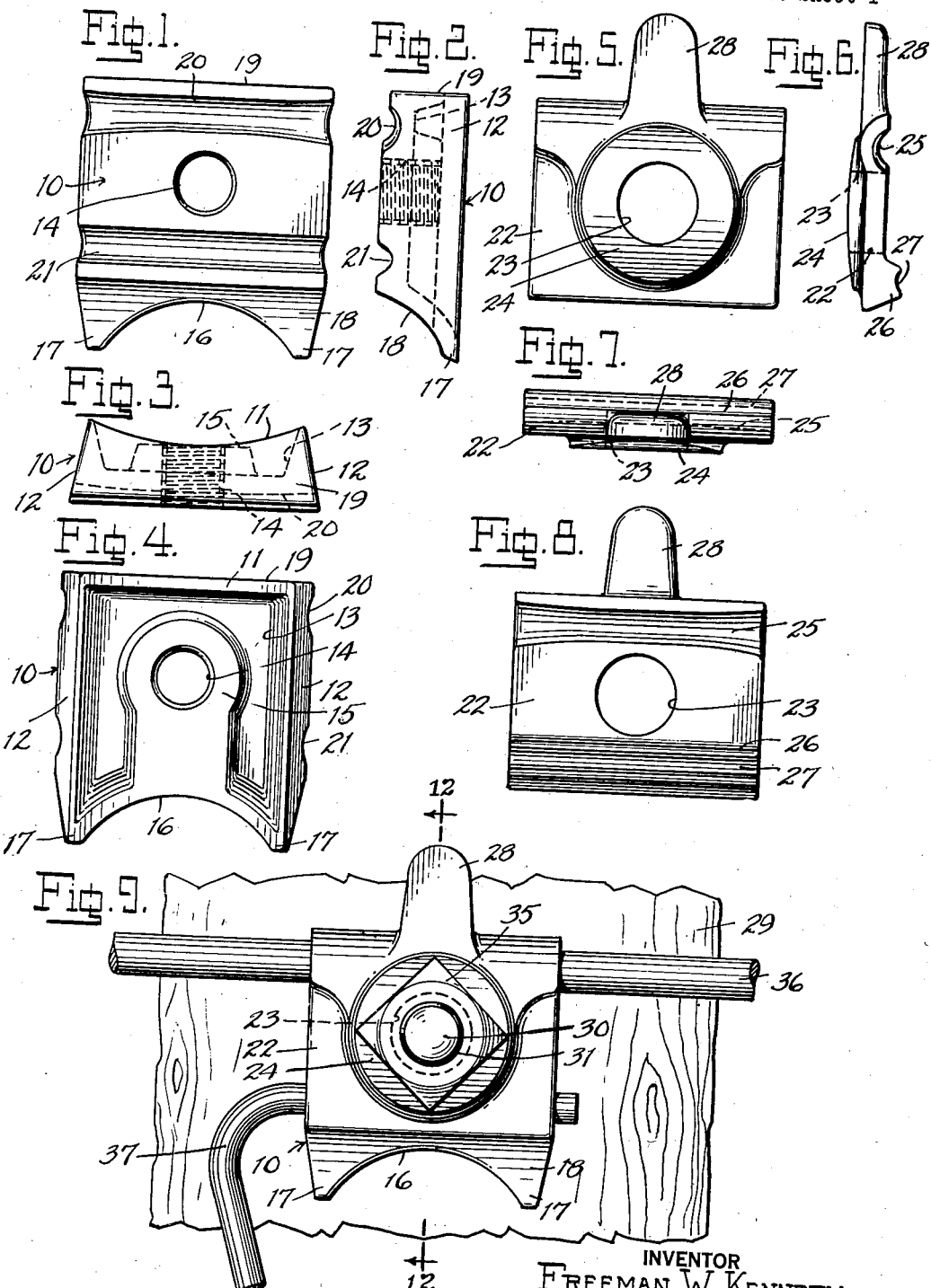

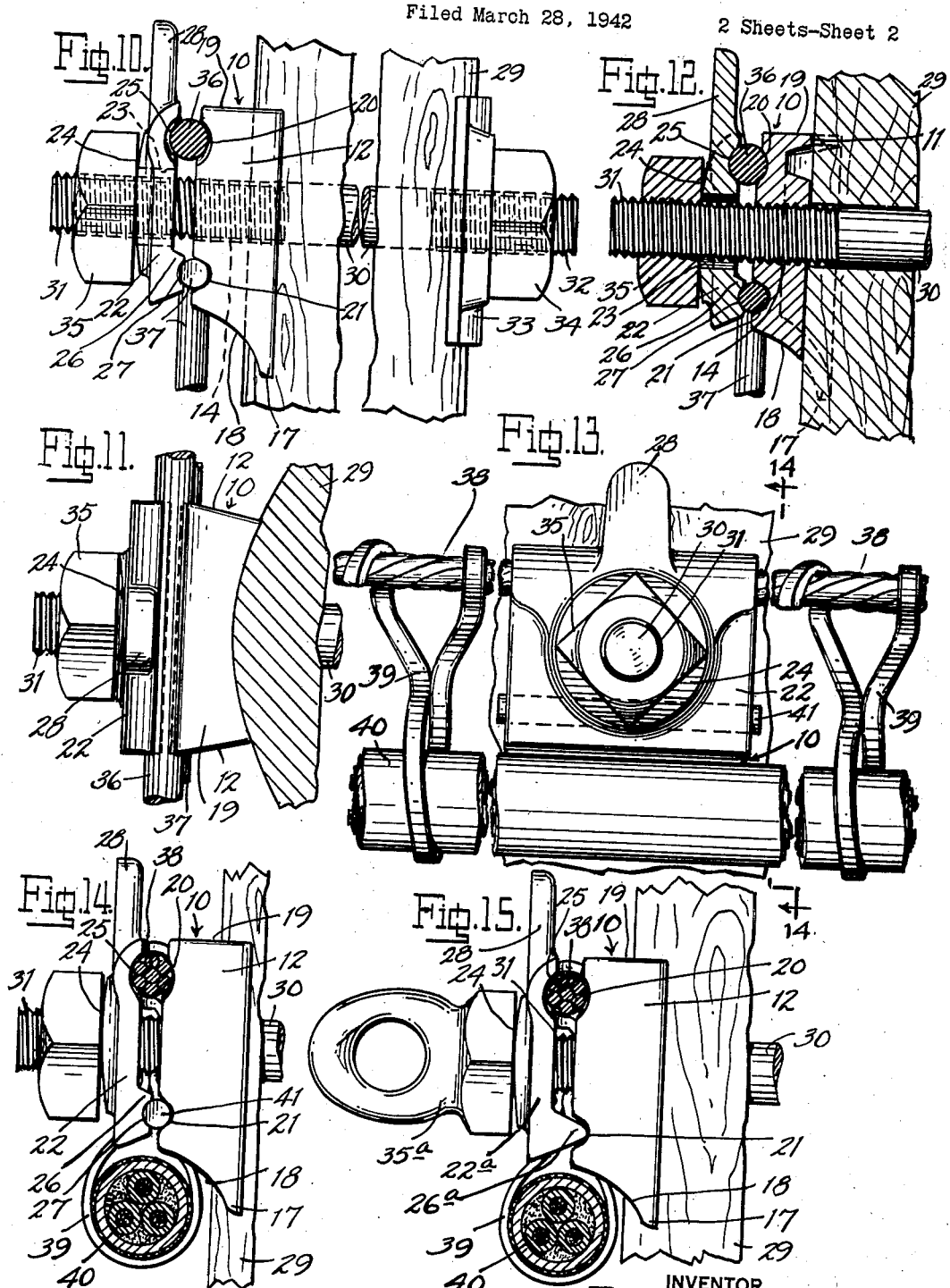

2,334,560

UNITED STATES PATENT OFFICE 2,334,560

POLE ATTACHMENT SUSPENSION CLAMP FOR AERIAL WIRES AND CABLES

Freeman W. Kennedy, Montclair, N. J., assignor to Malleable Iron Fittings Company, Branford, Conn., a corporation of Connecticut Application March 28, 1942, Serial No. 436,701

6 Claims. (Cl. 174—40)

The present invention relates to pole attachment suspension clamps for aerial wires and cables, and particularly a suspension clamp for use in connection with pole-carried electric transmission, distribution, and communication lines. The invention is especially applicable to systems in which certain of the wires are neutral ground wires, while others are current conducting wires or cables supported from cable messengers and wherein it is also a part of such systems to employ individual pole ground wires for grounding certain of the poles of the system. It is an object of the invention to provide a clamp adapted for these various uses, so that in stringing the wires and cables it will not be necessary to employ a different type of clamp for every different type of connection.

A further object is to provide a clamp which will accommodate different diameter wires, within certain limits, and in which a fulcrum member is provided in the form of a short length of wire, which may be selected according to its diameter so as to accommodate the clamp to different diameters of wires supported therein, and whereby a substantially parallel relation may be maintained between the clamp body and clamping member, irrespective of the size of the wire supported.

A further object is to provide a fulcrumed clamping member having a convex nut engaging bearing portion by means of which the clamping nut may be engaged therewith substantially in the plane of the axis of the nut, with the clamping member in varying positions of angular adjustment about its fulcrum axis, so that an efficient clamping action will be maintained upon the wire supported by the clamp irrespective of the diameter of the wire.

A further object is to provide a clamp adapted to be bolted to the supporting pole, and having a wire clamping member engaged with the end of the bolt, and in which the connection of the bolt with the clamp body is independent of its connection with the clamping member, so that shrinkage or other conditions which may affect the connection of the clamp body with the pole will not loosen or otherwise affect the relation of the clamping member with the clamp body, and therefore such pole shrinkage or other conditions will not in any way jeopardize or loosen the clamping connection with the supported wires.

A further object is to provide a clamp in which the clamp body may be rigidly bolted to the pole, and having a movable clamping member cooperating with the clamp body for the purpose of supporting the wire to be clamped prior to its final clamping by the clamp, so that the proper slack and tension may be established in the wire and thereupon the workmen may be enabled to immediately clamp the position of the wire while maintaining the desired tension and slack.

A further object is to provide a clamp adapted for the clamping of two spaced wires arranged parallel to each other, and wherein one of the wires constitutes a fulcrum about which the clamp may be moved to clamp it with the other wire, and in carrying out this purpose of the invention, the fulcrum wire may either be one of the wires of the electric system, thus serving a dual function, or it may be a short length wire having as its only function the provision of the fulcrum means.

A further object is to provide a clamp having a minimum amount of metal while maintaining a maximum amount of strength and structural support structure, and to this end it is proposed to provide a clamp body having downwardly extending supporting foot portions for engaging the pole below the bolt and supported wire structure to provide an effective brace for the supported load, the upper side of the clamp being designed to provide a guiding saddle for retaining and guiding the wire as it is being strung and tensioned preliminary to clamping it.

Another object is to provide a clamp in which a single bolt is provided for connection to the pole and for actuating the clamping member, and wherein suitable structure is provided to lock the clamp against rotary movement about the axis of the bolt, so that unequal load on the ends of the clamp will not have the effect of turning the clamp upon the bolt.

With the above and other objects in view, embodiments of the invention are shown in the accompanying drawings, and these embodiments will be hereinafter more fully described with reference thereto, and the invention will be finally pointed out in the claims.

In the drawings—

Fig. 1 is a front elevation of the clamp body.

Fig. 2 is a side elevation thereof.

Fig. 3 is a top plan view.

Fig. 4 is a rear elevation of the clamp body.

Fig. 5 is a front elevation of the clamping member.

Fig. 6 is a side elevation thereof.

Fig. 7 is a top plan view.

Fig. 8 is a rear elevation of the clamping member.

Fig. 9 is a front elevation of the complete clamp mounted upon a pole, and showing a neutral ground wire and an individual pole ground wire clamped and supported thereby.

Fig. 10 is a side elevation of the clamp, mounted upon the pole as shown in Fig. 9, the intermediate portion of the pole being broken away.

Fig. 11 is a plan view thereof, only the forward portion of the pole adjacent the clamp being shown.

Fig. 12 is a vertical sectional view, taken along the line 12—12 of Fig. 9.

Fig. 13 is a front elevation showing the clamp supporting a cable messenger upon which is suspended a current conducting wire or cable.

Fig. 14 is a side elevation of the clamp, as shown in Fig. 13, the supported wires being shown in section along the line 14—14 of Fig. 13.

Fig. 15 is a side elevation similar to Fig. 14, and illustrating a modified form of the clamping member in which a fulcrum rib is integrally formed thereon in place of the fulcrum wire piece employed with the form of clamping member illustrated in Figs. 1 to 14.

Similar reference characters indicate corresponding parts throughout the several parts of the drawings.

Referring to the drawings the suspension clamp, according to the exemplary embodiments of the invention shown therein, comprises a clamp body 10, having the major portion of its forward surface arranged in a vertical plane and having its rearward side curved, as at 11, to conform substantially to the circumferential surface of the wood pole to which the clamp is adapted to be attached. The vertical side surfaces 12 of the clamp body preferably converge toward the rear and form, with the vertical outwardly diverging walls of the hollowed out recess 13 in the rear face, vertically disposed relatively sharp edges at each side edge of the curved rearward side which tend to bite into the wood pole upon tightening of the clamp body thereto to resist any tendency to rotate about the securing bolt.

A threaded hole 14 for receiving the securing bolt is provided through the clamp body substantially centrally thereof, and at the rearward side the hollowed out recess 13 is outwardly spaced from this hole, so that a substantial thickness of metal is provided through which the hole extends providing the greatest possible thread length and providing at the same time a relatively wide bearing portion 15 around the hole at the rearward side to engage against the pole surface. This bearing portion extends downwardly from the hole 14 to the lower edge of the clamp body, which lower edge is arched, as at 16, to provide a pair of downwardly projecting foot portions 17 at each of the lower corners of the clamp body to provide bracing supports against the pole surface to sustain the load on the clamp and to resist turning movement of the clamp around the bolt.

The forward side of the lower portion of the clamp body is curved, as at 18, downwardly and rearwardly from a line just below the lower groove of the wire clamping face to the lower ends of the pointed foot portions 17. The upper side 19 of the body member is substantially flat and horizontal, and is adapted with the clamping member, presently to be more fully referred to, to form a saddle for supporting the wire being strung preliminarily to its being clampingly engaged by the clamp.

A horizontal substantially circular cross-section groove 20 is provided in the front face of the clamping body between the hole 14 and the upper side 19, the end portions of the groove being belled out in vertical and lateral directions so as to prevent producing sharp bends in the wire which might cause crystallization, the lower side of the groove being preferably belled to a greater extent than the upper side to substantially conform to the normal sag of the wire between poles. The forward surface of the clamp body between this groove and the upper side 19 is preferably rearwardly offset from the surface of the body below the groove, for the purpose of providing a clearance space to permit a maximum clamping action of the clamping member in the case of clamping a relatively small diameter wire and where the clamping member assumes a substantially tilted position, this clearance preventing contact of the clamping member with the upper end of the clamp body before maximum clamping action is applied to the wire.

In the lower portion of the face of the clamp body there is provided a horizontal groove 21 arranged in spaced parallel relation to the groove 20 and disposed between the hole 14 and the lower curved surface 16, and in which there is adapted to be engaged and clamped the individual pole ground wire, or a separate length of wire, for the purpose of providing a fulcrum support for the clamping member, as will presently more fully appear. The cross-section of this groove is preferably V-shaped and rounded at the bottom, so that it may have various diameters of wires seated therein and in each case the wire will be firmly engaged therewith along two lines of contact.

The clamping member 22 is in the form of a plate of substantially rectangular outline to conform to the shape of the forward face of the clamping body member, and is provided centrally with a circular passage 23 through which the securing bolt is loosely engaged to permit of a substantial degree of tilting movement of the clamping member relatively to the body member. In surrounding relation to the passage 23 there is provided at the forward side a raised bearing platform portion 24, of cylindrical form convexly curved rearwardly above and below its horizontal center portion, and which is adapted to provide a bearing surface for the securing nut having clearance above and below the passage 23, so that in various angular positions of the clamping member the nut will firmly engage the clamping member along the central region of the bearing platform at each side of the passage 23. Consequently, an effective clamping action can be obtained, either in the normal vertical position of the clamping member, or when it is inclined forwardly or rearwardly, as in the case of clamping wires of substantially larger or smaller diameters.

In the upper portion of the rearward face of the clamping member, between its upper edge and the passage 23, there is provided a groove 25, belled out vertically and laterally at its end portions and which is complementary to the groove 20 of the clamp body in the operative position of the clamp. At the lower portion of the clamp between its lower edge and the passage 23 there is provided a longitudinal rib 26 disposed in opposed relation to the groove 21 of the clamp body and having in its face a groove 27 for clamping engagement with the length of wire engaged in the groove 21, the clamped wire constituting a fulcrum about which the clamping member swings as it is tightened into clamping relation with the wire clamped in the upper grooves 20 and 25.

Upon the upper edge of the clamping member and centrally thereof, there is provided an upwardly projecting finger 28 which is adapted to act as a retaining hook for the wire being strung, while the wire is disposed on the upper saddle surface of the clamp preparatory to being clamped, the upward projection of this finger being sufficient to retain the wire as the desired slack and tension is applied thereto.

The clamp body is secured to the pole 29 by means of a screw bolt 30, threaded at its respective end portions 31 and 32, the threaded end 31 being screwed through the threaded hole 14 of the clamp body and projecting therefrom to receive the clamping member and the retaining and tightening nut, as will presently more fully appear. The other threaded end 32 has a curved pole engaging washer 33 and a nut 34 engaged thereon, and by tightening this nut the clamp body is tightly secured to the pole. It will be understood that instead of the nut 34 the rearward end of the bolt may have a head formed thereon in which case the clamp body is secured by turning this bolt. However, the separate nut 34 is preferred, as in this case the clamp body may be tightened with respect to the pole simply by turning the nut 34, and without disturbing the relation of the clamping member and clamped wires with respect to the clamp body. A retaining and tightening nut 35 is engaged upon the forward threaded end 31 of the bolt and is adapted upon being tightened to press the clamping member toward the clamping body by swinging movement about the fulcrum formed by the wire engaged in the lower grooves 21 and 27.

As shown in Figs. 9 to 12, the clamp is illustrated as clamping and supporting a neutral ground wire 36 in the upper grooves 20 and 25 of the clamp body and clamping member, this ground wire extending from pole to pole throughout the electrical system, and in the lower grooves 21 and 27 there is clamped the end of an individual pole ground wire 37, this wire being carried downwardly and stapled or otherwise fixed to suitable molding on the pole. This individual pole ground wire is normally of smaller diameter than the neutral wire 36, and in its clamped relation in the grooves 21 and 27 constitutes a fulcrum about which the clamping member swings as it is clamped into engagement with the neutral wire. As shown, the relative diameters of the wires 36 and 37 are such that in the normal clamped position the clamping member is substantially parallel to the front surface of the clamp body. In the case of smaller diameter wires of the same relative proportions, this parallel relation would be maintained. However, the clamping action can be effectively carried out in connection with wires of different proportions, the clamping member swinging to an angular position about the fulcrum to its clamping position, the relatively large diameter passage 23 permitting this swinging action, and the convexly curved bearing surface 24 engaged by the nut 35 being such that the nut will bear firmly along the central lateral region of the bearing surface to firmly retain the clamped position of the clamping member.

In the usual electrical system individual pole ground wires are not usually employed upon each pole but may be provided upon alternate poles. In this case, the same type of clamp according to the invention, is employed on all the poles, and instead of the ground wire 37, a short length of wire is clamped in the lower grooves 21 and 27 to function as a fulcrum, the diameter of this short length of wire being suitably proportioned with respect to the diameter of the neutral wire. Such a short length of wire is shown in the illustration of one of the uses of the invention in Figs. 13 and 14.

In Figs. 13 and 14, I have illustrated the use of the clamp according to the invention for supporting and clamping a cable messenger wire 38, which is illustrated as in the form of a stranded cable, and upon which is suspended by means of suitable suspension hanger clips 39 a conductor wire 40. Within the lower grooves 21 and 27, there is provided a short length of wire 41, adapted to function as a fulcrum for the clamping member, its diameter being suitably proportioned in respect to the diameter of the cable messenger wire.

In Fig. 15, I have shown a modification of the invention in which an alternate form of clamping member 22ª is employed, and which is particularly adapted for use in connection with a cable messenger wire or other type of wire which does not have an individual ground wire associated therewith. In this alternate form, the rib 26 of the first form of the clamping member does not have its projected surface grooved to receive a wire but is extended as a wedge shaped fulcrum rib 26ª for direct engagement in the groove 21 of the clamp body. In this illustration of the invention, I have also shown an alternate form of retaining and tightening nut 35ª of the eye-nut type, and which may be employed in installations where it is desired to connect a branch wire or a guy wire to the clamp. It will be understood of course, that this type of eye-nut may be employed in connection with the other illustrated uses of the invention.

I have illustrated and described preferred and satisfactory embodiments of the invention, but it will be understood that changes may be made therein, within the spirit and scope thereof, as defined in the appended claims.

Having thus described my invention, what I claim and desire to secure by Letters Patent is:

1. In a pole attachment suspension clamp for aerial wires and cables, a pole engaging clamp body member having a pole engaging rearward surface and having a threaded bolt receiving hole extending from its rearward to its forward surface, a bolt adapted to extend through a pole having anchoring means at one end for engaging the side of the pole opposed to said body member and having a threaded end portion at its other end screwed through said threaded hole of said body member and projecting forwardly therefrom, the threaded engagement of said bolt with said body member securing them against relative axial movement whereby the forwardly projecting end of said bolt is fixed with respect to said body member irrespective of shrinkage variations in the pole, a clamping member having a passage therethrough loosely engaged by the projected threaded end of said bolt to permit limited swinging movement of said clamping member relatively to said body member, said body member and said clamping member being provided at one side of said bolt with complementary wire receiving grooves in their opposed surfaces, fulcrum means at the other side of said bolt cooperatively arranged between said body member and said clamping member, and a nut engaged on the projected threaded end of said bolt adapted to tighten said clamping member in clamping relation to a wire engaged in said grooves between said body and clamping members through swinging movement of said clamping member about said fulcrum means relatively to said body member fixedly engaged by said bolt screwed therethrough.

2. In a pole attachment suspension clamp for aerial wires and cables, a pole engaging clamp body member having a curved pole engaging rearward surface having a substantially centrally disposed bearing surface for engagement with the pole surface and a recess between said bearing surface and the outer peripheral wall, and said body member having a threaded bolt receiving hole extending from said rearward bearing surface to its forward surface, a bolt adapted to extend through a pole having anchoring means at one end and engaging the side of the pole opposed to said body member and having a threaded end portion at its other end screwed through said threaded hole of said body member and projecting forwardly therefrom, the threaded engagement of said bolt with said body member securing them against relative axial movement whereby the forwardly projecting end of said bolt is fixed with respect to said body member irrespective of shrinkage variations in the pole, a clamping member having a passage therethrough loosely engaged by the projected threaded end of said bolt to permit limited swinging movement of said clamping member relatively to said body member, said body member and said clamping member being provided at one side of said bolt with complementary wire receiving grooves in their opposed surfaces, fulcrum means at the other side of said bolt cooperatively arranged between said body member and said clamping member, and a nut engaged on the projected threaded end of said bolt adapted to tighten said clamping member in clamping relation to a wire engaged in said grooves between said body and clamping members through swinging movement of said clamping member about said fulcrum means relatively to said body member fixedly engaged by said bolt screwed therethrough.

3. In a pole attachment suspension clamp for aerial wires and cables, a pole engaging clamp body member having a curved pole engaging rearward surface having a substantially centrally disposed bearing surface for engagement with the pole surface and a recess between said bearing surface and the outer peripheral wall, said outer peripheral wall having vertical side wall portions of substantially V-shape in cross-section with their pointed edges directed rearwardly, and said body member having a threaded bolt receiving hole extending from said rearward bearing surface to its forward surface, a bolt adapted to extend through a pole having anchoring means at one end for engaging the side of the pole opposed to said body member and having a threaded end portion at its other end screwed through said threaded hole of said body member and projecting forwardly therefrom, the threaded engagement of said bolt with said body member securing them against relative axial movement whereby the forwardly projecting end of said bolt is fixed with respect to said body member irrespective of shrinkage variations in the pole, a clamping member having a passage therethrough loosely engaged by the projected threaded end of said bolt to permit limited swinging movement of said clamping member relatively to said body member, said body member and said clamping member being provided at one side of said bolt with complementary wire receiving grooves in their opposed surfaces, fulcrum means at the other side of said bolt cooperatively arranged between said body member and said clamping member, and a nut engaged on the projected threaded end of said bolt adapted to tighten said clamping member in clamping relation to a wire engaged in said grooves between said body and clamping members through swinging movement of said clamping member about said fulcrum means relatively to said body member fixedly engaged by said bolt screwed therethrough.

4. In a pole attachment suspension clamp for aerial wires and cables, a pole engaging clamp body member having a pole engaging rearward surface and having a threaded bolt receiving hole extending from its rearward to its forward surface, a bolt adapted to extend through a pole having anchoring means at one end for engaging the side of the pole opposed to said body member and having a threaded end portion at its other end screwed through said threaded hole of said body member and projecting forwardly therefrom, the threaded engagement of said bolt with said body member securing them against relative axial movement whereby the forwardly projecting end of said bolt is fixed with respect to said body member irrespective of shrinkage variations in the pole, a clamping member having a passage therethrough loosely engaged by the projected threaded end of said bolt to permit limited swinging movement of said clamping member relatively to said body member, said body member and said clamping member being provided at one side of said bolt with complementary wire receiving grooves in their opposed surfaces, said body member having a fulcrum wire receiving groove at the other side of said bolt, a fulcrum wire receiving grooved rib on said clamping member, adapted with said wire receiving groove to receive a fulcrum wire cooperatively arranged between said body member and said clamping member, and a nut engaged on the projected threaded end of said bolt adapted to tighten said clamping member in clamping relation to a wire engaged in said first mentioned grooves between said body and clamping members through swinging movement of said clamping member about said fulcrum wire relatively to said body member fixedly engaged by said bolt screwed therethrough.

5. In a pole attachment suspension clamp for aerial wires and cables, a clamp body member having a curved pole engaging rearward surface and having a threaded bolt receiving hole extending from its rearward to its forward surface, a bolt adapted to extend through a pole having a threaded end portion screwed through said threaded hole of said body member and projecting forwardly therefrom, a clamping member having a passage therethrough loosely engaged by the projected threaded end of said bolt to permit limited swinging movement of said clamping member relatively to said body member, said body member and said clamping member being provided at one side of said bolt with complementary wire receiving grooves in their opposed surfaces, said body member having a fulcrum rib receiving groove at the other side of said bolt, a fulcrum rib on said clamping member engaged with said fulcrum rib receiving groove, and a nut engaged on the projected threaded end of said bolt adapted to tighten said clamping member in clamping relation to a wire engaged in said first mentioned grooves between said body and clamping members through swinging movement of said clamping member about said fulcrum rib relatively to said body member fixedly engaged by said bolt screwed therethrough.

6. In a pole attachment suspension clamp for aerial wires and cables, a clamp body member having a curved pole engaging rearward surface and having a threaded bolt receiving hole extending from its rearward to its forward surface, a bolt adapted to extend through a pole and having a threaded end portion screwed through said threaded hole of said body member and projecting forwardly therefrom, a clamping member having a passage therethrough loosely engaged by the projected threaded end of said bolt to permit limited swinging movement of said clamping member relatively to said body member, said body member and said clamping member being provided at one side of said bolt with complementary wire receiving grooves in their opposed surfaces, said grooves extending horizontally and being belled out both vertically and laterally toward their ends, fulcrum means at the other side of said bolt cooperatively arranged between said body member and said clamping member, and a nut engaged on the projected threaded end of said bolt adapted to tighten said clamping member in clamping relation to a wire engaged in said grooves between said body and clamping members through swinging movement of said clamping member about said fulcrum means relatively to said body member fixedly engaged by said bolt screwed therethrough.

FREEMAN W. KENNEDY.